Figure 1:
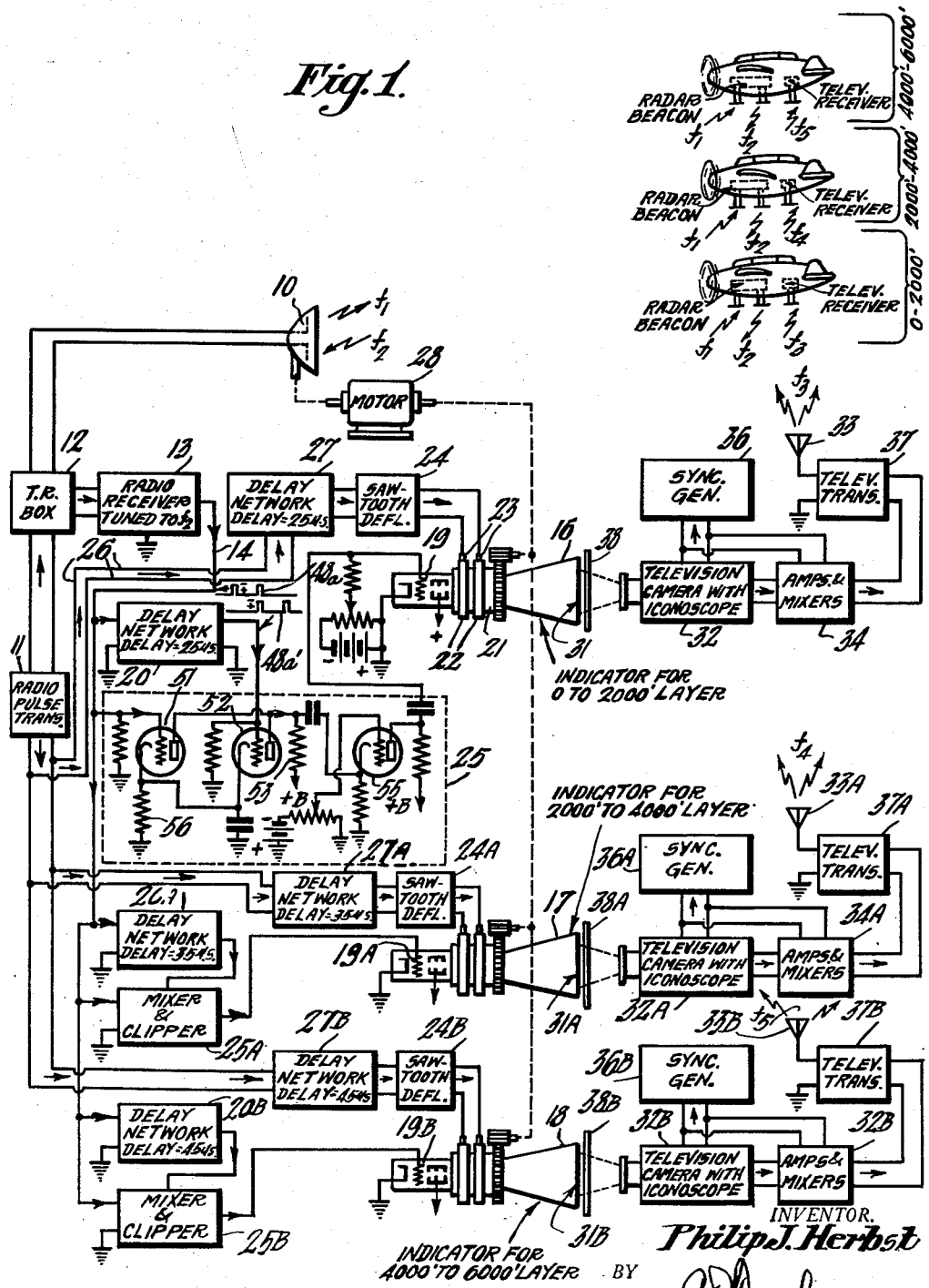

May 6, 1952     P. J. HERBST     2,595,358

RADIO NAVIGATION SYSTEM FOR TARGETS IN ALTITUDE LAYERS

Filed Sept. 27, 1945     2 SHEETS—SHEET 1

INVENTOR.
Philip J. Herbst
ATTORNEY

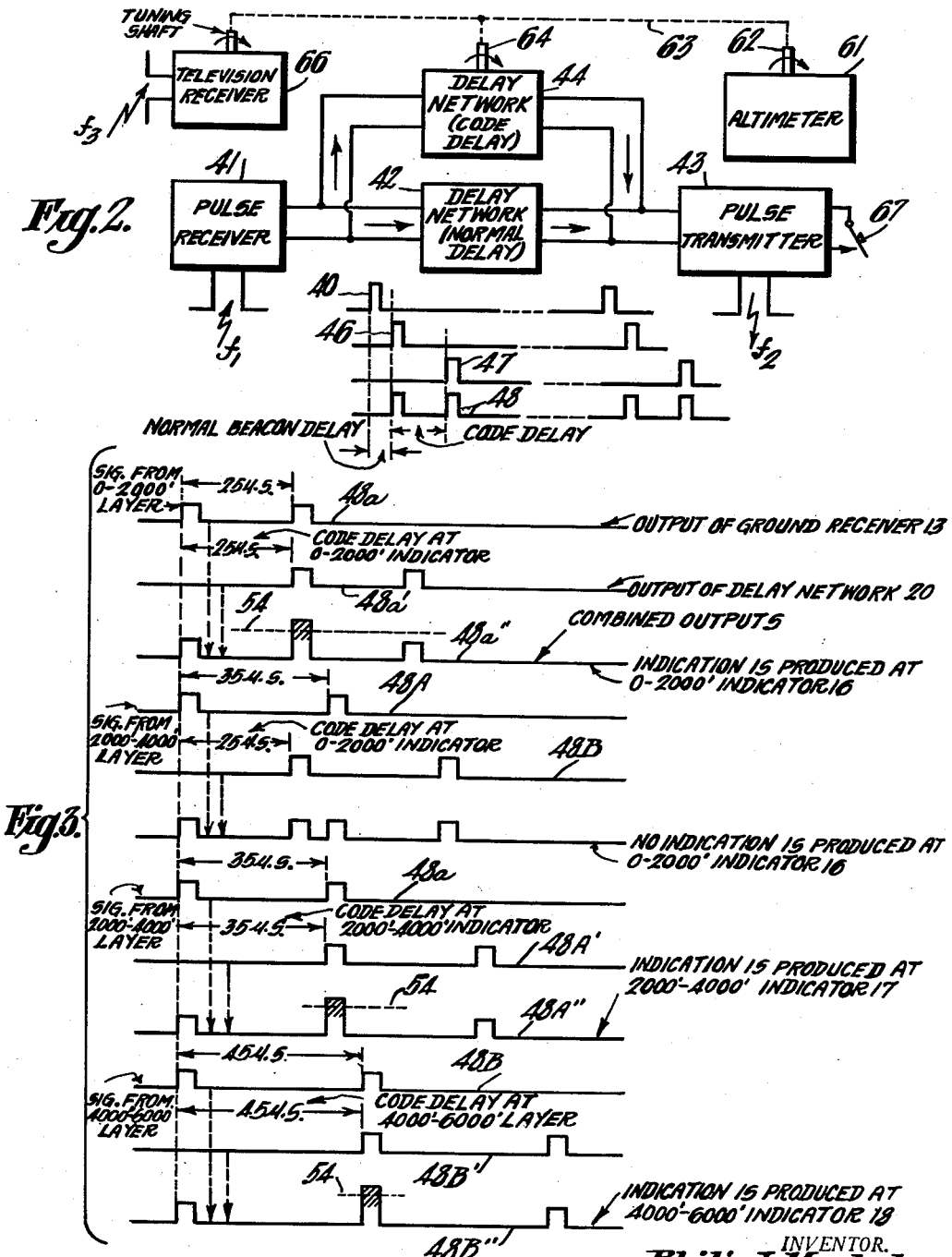

Patented May 6, 1952

2,595,358

UNITED STATES PATENT OFFICE 2,595,358

RADIO NAVIGATION SYSTEM FOR TARGETS IN ALTITUDE LAYERS

Philip J. Herbst, Princeton, N. J., assignor to Radio Corporation of America, a corporation of Delaware Application September 27, 1945, Serial No. 618,969

7 Claims. (Cl. 343—6)

1

My invention relates to radio navigation and traffic control systems and particularly to systems for ship or aircraft operations wherein the desired information is obtained from radar or transponder beacons interrogated by radar pulses.

The term "transponder" as used herein is intended to mean a combination including a receiver designed to receive signals which are referred to hereinafter as "interrogation" or "trigger" signals, and a transmitter controlled by the output of said receiver to transmit other signals which are called "reply" signals.

The invention provides means for automatically discriminating between responses from several groups of transponder beacons so that the responses from each group may be separately examined or utilized. The invention is particularly applicable, for example, to systems such as that described in the copending application Serial No. 607,999½, filed July 31, 1945 in the name of Loren F. Jones and entitled Radio Navigation System. In the Jones application there is described and claimed a navigation system for ships or aircraft which comprises a radar system such as a plan position indicator system (P. P. I. system) on the ground and a television transmitter for transmitting the P. P. I. view of craft within the service area of the P. P. I. and television stations to said craft. Each ship or aircraft carries a television receiver and a radar or transponder beacon, also, if the present invention is employed. Preferably, a map superimposed on the P. P. I. view is transmitted also by the television transmitter.

An object of the present invention is to provide an improved radio navigation and/or traffic control system.

A further object of the invention is to provide a means of separating the responses from aircraft in different altitude groups in systems employing ground search radar.

A further object of the invention is to provide a combined radar and television navigation system having improved means for transmitting to aircraft in a particular altitude layer a P. P. I. or other radar picture of only the aircraft within a certain altitude layer or altitude range.

A still further object of the invention is to provide in a radar navigation or control system an improved method of and means for distinguishing between aircraft flying in different altitude layers and providing such separation of data for the simplification of traffic control procedures.

2

The invention will be described by way of example as applied to a system similar to that described in the above-mentioned Jones application wherein the ground station comprises a P. P. I. system which radiates radio pulses from a directional antenna that is continuously rotated through 360 degrees to search for aircraft in the vicinity. A cathode ray indicator tube is provided with a deflecting yoke that is rotated in synchronism with the antenna, and the cathode ray is simultaneously deflected radially at a comparatively rapid rate in synchronism with the pulse transmission. Radio pulses reflected or retransmitted from said aircraft are picked up by said antenna and caused to modulate the cathode ray. Thus there appears on the cathode ray screen a view wherein a spot on the screen corresponds to a particular aircraft, and wherein the aircraft's position with respect to the P. P. I. antenna is shown.

This view is transmitted by a television transmitter so that it may be received by any aircraft within the service area that is equipped with a television receiver. Since the P. P. I. picture may show a plurality of aircraft in the service area, suitable means is provided to show a pilot or navigator which one of the spots in the picture is the one corresponding to his airplane.

Each aircraft carries a radar pulse repeater unit which is referred to as a radar beacon or transponder beacon. Each transponder beacon transmits two pu'ses in response to interrogation by the ground search radar station, that is, in response to the reception of a pulse by the P. P. I. station. The two pulses thus transmitted are separated by a code time interval, a particular code interval being assigned to a certain group of aircraft. In the example being described, the aircraft flying in a particular altitude layer such as from 0 to 2000 ft. are assigned one code delay time while those in a different altitude layer such as from 2000 to 4000 ft. are assigned a different code delay time. At the ground radar station suitable means is provided for causing signal of a particular code delay to appear on a preassigned indicator tube screen.

The invention will be better understood from the following description taken in connection with the accompanying drawing in which Figure 1 is a block diagram illustrating one embodiment of the invention, Figure 2 is a block diagram of a system that may be carried by an aircraft which is to use the ground station of Fig. 1 for navigation, and Figure 3 is a group of graphs illustrating the operation of the system shown in Figs. 1 and 2.

In the several figures, similar parts and graphs are indicated by similar reference characters.

Referring to Fig. 1, the ground station comprises a radar system of the P. P. I. type which includes a rotatable directive antenna 10, a radio pulse transmitter 11 which is coupled to the antenna 10 through a transmit-receive or T-R box 12 that functions as an antenna duplexer as is well known in the art. Reflected or retransmitted pulses are received by the antenna 10 and supplied through the T-R box 12 to a radio pulse receiver 13. A plurality of indicator circuits are supplied with signal from the receiver 13 through a conductor 14. The three indicator circuits shown include the cathode ray indicator tubes 16, 17 and 18.

The cathode ray indicator tube 16 may be of conventional design having a control grid 19 to which pulses from the receiver 13 are applied. The pulses are supplied from the receiver 13 to the grid 19 through the conductor 14 and through a decoding delay network 20 and a mixer and clipper circuit 25, described hereinafter. The cathode ray is deflected radially by means of a deflecting yoke 21 comprising a pair of deflecting coils and provided with conductor rings 22 and brushes 23 whereby the yoke 21 may be rotated during the radial deflection. A sawtooth deflecting wave is supplied to the deflecting yoke 21 from a sawtooth deflection circuit 24. The deflection circuit 24 is synchronized with the pulse transmission by means of pulses taken off the pulse transmitter 11 and supplied over conductors 26 and through a delay network 27 to the circuit 24. The delay network 27 is employed to delay the start of the cathode ray sweep at the tube 16. The amount of this delay depends on the coding delay assigned to the aircraft flying in a particular altitude layer and which are to be indicated on the cathode ray tube 16. In the example being described, the indicator tube 16 shows the aircraft in the 0–2000 foot altitude layer.

A motor 28 is mechanically coupled to the antenna 10 and to the yoke 21 for rotating them in synchronism at some slow rate such as one rotation every six seconds.

The cathode ray tube 16 is provided with a phosphorescent screen 31 having long persistence. Light spots appear on the screen 31, as in the usual P. P. I. picture, which corresponds to the aircraft that reflect or retransmit the radio pulses. Also, a rotating radial line or marker line may be made to appear on the screen 31. A spot in the P. P. I. picture corresponds to an aircraft, the distance of the spot from the center of the picture showing the distance from the radar station to said aircraft, and the angular position of the spot showing the azimuth of the aircraft with respect to the radar station.

The P. P. I. picture on the screen 31 is picked up by a television camera 32 of a conventional type including an Iconoscope or Orthicon and is transmitted from an antenna 33 which, in the present example, is non-directive. The television transmitting system is of conventional design and comprises, in addition to the television camera 32, suitable amplifiers and mixers indicated at 34, a synchronizing pulse generator 36 that supplies synchronizing signal to the horizontal and vertical deflecting circuits of the camera 32 and to the amplifiers and mixers 34, and a radio transmitter 37 that transmits a carrier wave modulated by the usual mixture of picture and synchronizing signals.

A map 38 of the territory surrounding the ground station preferably is superimposed on the P. P. I. picture and transmitted therewith. The map may be drawn on transparent material and suitably illuminated.

Referring now to the aircraft equipment, each aircraft is provided with a radar beacon, also referred to as a transponder beacon, that receives the ground station pulses on the carrier frequency $f_1$ and retransmits pulses on the carrier frequency $f_2$ as indicated in Fig. 1. Each aircraft is also provided with a television receiver which is tuned to the carrier frequency assigned to the particular altitude layer in which the aircraft is flying as indicated in Fig. 1. This aircraft beacon equipment is shown in detail in Fig. 2 and will be described with reference to Fig. 2 hereinafter. As illustrated in Fig. 1, the aircraft in the 0–2000' layer receives a picture that is a duplicate of the combined view of the P. P. I. picture of tube 16 and the map 38, this composite picture being transmitted at the carrier frequency $f_3$. The spots in the received picture correspond to the spots on the P. P. I. screen 31 which are representative of aircraft. Therefore, the pilot of an aircraft can see his location with respect to the airport and with respect to anything else shown on the map providing he can determine what spot in the P. P. I. picture corresponds to his own aircraft. Suitable means for obtaining such aircraft identification will be described hereinafter.

Referring to Fig. 2, the radar beacon carried by each aircraft comprises a radio pulse receiver 41 which receives and demodulates the radar pulses transmitted from the ground station on a carrier wave frequency $f_1$. The demodulated pulses shown by the graph 40 may be sent through a delay line or network 42 and the resulting delayed pulses shown by the graph 46 are applied as modulating pulses to a radio transmitter 43 operating on a carrier wave frequency $f_2$. The demodulated pulses are also applied by way of a branch circuit through a delay network 44 to obtain the delayed pulses shown by the graph 47 which are also applied as modulating pulses to the transmitter 43. As shown by the graph 48, the pulses 46 and 47 appear as pairs of pulses at the input of transmitter 43 to provide pulse time coding. Thus each pulse received at the beacon is retransmitted as a pair of pulses at the carrier frequency $f_2$. The delay introduced by the network 42 and the difference in the frequencies $f_1$ and $f_2$ are utilized to prevent "singing" of the beacon circuit. As will be explained hereinafter, the delay network 42 may be omitted if desired. The delay introduced by the network 44 is utilized for coding purposes, a particular coding delay being assigned for each altitude layer. These altitude layers and the corresponding code delays may, for example, be as follows:

0 to 2000 ft.—25 $\mu$s. code delay.
2000 ft. to 4000 ft.—35 $\mu$s. code delay.
4000 ft. to 6000 ft.—45 $\mu$s. code delay.

The graphs in Fig. 3 illustrate the method of decoding the retransmitted signals at the ground station. If an aircraft flying at an altitude of less than 2000 feet receives pulses from the ground station, the aircraft beacon transmits the pairs of pulses represented by graph 48a, and these pulses appear at the output of the receiver 13. It is assumed for the purpose of illustration that each pulse of the graph 48a is of 5 μs. duration, and that the second pulse is delayed by the above-mentioned code delay of 25 μs. that is assigned to the 0 to 2000 ft. altitude layer.

The pairs of pulses 48a are applied from the receiver 13 to the decoding delay network 20 and to the vacuum tube 51 of the mixer-clipper circuit 25. The pairs of delayed pulses 48a' from the delay network 20 are applied to the vacuum tube 52 of the mixer clipper-circuit 25. The pulses supplied to the tubes 51 and 52 add due to the common plate resistor 53 as indicated by the graph 48a'' (Fig. 3). The combined pulse preferably is clipped off at a predetermined level by means of a clipper tube such as the tube 55 which is biased beyond plate current cut-off.

It will be noted that in graph 48a'' one pulse is of greater amplitude than the others since the decoding delay of 25 μs. has caused the first pulse of graph 48a' to occur simultaneously with the second pulse of graph 48a. Only the top portion of this high amplitude pulse is passed through the mixer-clipper circuit 25 to the grid 19 of the cathode-ray indicator tube 16, this being accomplished by adjusting the bias on the tube 55 to make it clip or limit at the level indicated by the dotted line 54. Preferably, the radio receiver 13 is adjusted to limit the amplitude of the pulses before they are applied to the mixer-clipper circuit 25 so that there is no possibility of the lower amplitude pulses of the graph 48a'' passing through the circuit 25.

It will be apparent that the start of the radial deflection of the cathode ray in the tube 16 should be delayed by substantially the same amount that the pulse appearing on the grid 19 has been delayed by the delay network. Otherwise, the spot produced on the screen 31 by the pulse would not appear at the correct distance from the center of the screen to indicate the distance to the aircraft, or it might not appear on the screen at all. For this reason, the delay network or circuit 27 delays the sawtooth wave triggering pulse by an amount equal to the coding delay, which in this instance is 25 μs.

As previously stated, the view of aircraft in the 0 to 2000 ft. layer thus obtained on the screen 31 is televised to said aircraft on the carrier wave of frequency $f_3$. Since the television receivers on aircraft or other altitude layers are tuned to frequencies other than $f_3$ they will not receive the picture on screen 31.

If there is an aircraft in the 2000 to 4000 ft. layer, its beacon will transmit pairs of pulses with a code delay of 35 μs. as shown at 48A in Fig. 3. These pulses will produce no indication at the indicator tube 16 because the decoding network 20 delays them only 25 μs. as shown at 48B so that no pulses are superimposed or added. Likewise, as will be apparent from the following description, the pulses 48a from the 0 to 2000 ft. layer will not affect the indicators 17 and 18 for the other altitude layers.

Referring now to the indicator and television circuits for the 2000 to 4000 ft. indicator 17 and for the 4000 to 6000 ft. indicator at 18, the parts corresponding to those for the 0 to 2000 ft. indicator 16 are indicated by similar reference numbers with the suffixes A and B, respectively. If an aircraft in the 2000 to 4000 ft. layer receives radio pulses from the ground station, the radar beacon on said craft retransmits pairs of pulses with a code delay of 35 μs. as shown at 48A in Fig. 3. These pulses are supplied from the ground station receiver 13 to the delay network 20A and to the mixer-clipper circuit 25A whereby a pulse is applied to the indicator tube 17. This action is the same as previously described with reference to the operation of the indicator tube 16. Specifically, the decoding network 20A delays the pulses 48A to produce the delayed pulses 48A' which are applied to the mixer-clipper circuit 25A. The pulses 48A are also applied, without being delayed, to the circuit 25A so that the pulses 48A and 48A' add as shown at 48A''. Only the high amplitude pulse which results is applied to the grid of the indicator tube 17. Thus, only retransmitted pulses from the aircraft in the 2000 to 4000 ft. layer produce an indication on the tube 17, and only these aircraft appear on the picture produced on the screen 31A. This picture is televised on the carrier wave of frequency $f_4$ to the aircraft in the 2000 to 4000 ft. layer only.

In the same way, the retransmitted pairs of pulses 48B (Fig. 3) from the aircraft in the 4000 to 6000 ft. layer produce a pulse on the grid 19B of the indicator tube 18. This is illustrated in Fig. 3 where the pulses 48B are delayed by the decoding network 20B to produce the delayed pulses 48B'. The pulses 48B' and the undelayed pulses 48B are added in the mixer-clipper circuit 25B, as shown at 48B'', whereby a large amplitude pulse is obtained which passes through the circuit 25B to the grid 19B. It will be evident that pairs of pulses from other altitude layers will not produce any indication on the indicator tube 18. The resulting picture on the screen 31B showing aircraft in the 4000 to 6000 ft. layer is televised to these aircraft only on the carrier wave of frequency $f_5$.

It will be apparent from the foregoing that when an aircraft ascends or descends into a different altitude layer, the coding delay introduced by the delay network or circuit (network 43 in Fig. 2) should be changed. Preferably this is done automatically by a barometric altimeter which is indicated at 61 in Fig. 2. The altimeter shaft 62 assumes an angular position which is a function of altitude. The shaft 62 is mechanically coupled, as indicated by the broken line 63, to a rotatable switch shaft 64 at the delay network 44. Rotation of the shaft 64 switches the desired number of delay line sections into the circuit in steps, there being one switching step for each altitude layer.

As described in the above-identified Jones application and as indicated in Fig. 2, it is also desirable to have an altimeter, such as the altimeter 61, automatically change the tuning of the television receiver 66 on the aircraft in response to said aircraft going to a different altitude layer.

At an aircraft a pilot may determine which spot in the received picture represents his aircraft by closing momentarily the key 67 (Fig. 2) at the pulse transmitter 43 to increase or interrupt the transmitter power output. This will cause the said spot either to brighten momentarily or to disappear momentarily as the case may be.

If the delay network 42 is employed as shown in Fig. 2, it is advisable to provide at the ground radar receiver a delay correction such as a corresponding delay in the start of the sawtooth wave being applied to the deflecting yoke. Because of this, it may be preferred to omit the delay network 42 and substitute other means for minimizing the tendency of the beacon to "sing." For example, suitable means may be provided for blocking the receiver 41 immediately after the reception of a pulse and to unblock it before the next pulse is received.

While the invention has been described with particular reference to the use of coding for altitude layer identification, it may be used for other purposes. For example, the invention may be applied to a block system for traffic control of either ships or aircraft wherein different transponder codes are assigned to craft at different distances, respectively, from the ground search radar. Also, it will be apparent that for some applications of the invention, the television equipment may be omitted since an operator at the ground station may give instructions to the craft by means of the usual radio communication equipment.

I claim as my invention:

1. In combination, a control station comprising a pulse transmitter and a pulse receiver, a plurality of receiver-transmitter units for transmitting signals in response to reception of signals from said pulse transmitter, means for modulating said signals transmitted from said units with different modulation signals assigned to different units, each said modulated signal comprising two pulses which are spaced by a predetermined assigned time interval, said pulse receiver including a plurality of indicators and modulation responsive means for each of said indicators, said modulation responsive means including means for delaying said modulated signal in one channel by an amount substantially equal to the characteristic time interval of the desired signal, said modulation responsive means further including means for adding the delayed modulated signal from said one channel and the undelayed modulated signal from a second channel whereby the first and second pulse from said one channel and from said second channel, respectively, add to produce a combined pulse of increased amplitude.

2. In a control system for groups of aircraft that are to fly in different altitude layers, respectively, a ground station comprising a radio locator system, a transponder or repeater unit in each of said aircraft for retransmitting ground station signals in response to reception of signals transmitted by said ground station, means for modulating said retransmitted signals with a different modulation signal assigned to each of said altitude layers, each modulated signal comprising two pulses which are spaced by a predetermined assigned time interval, said locator system including a separate cathode ray tube indicator for each of said altitude layers and modulation responsive means for each of said indicators, said modulation responsive means including means for delaying said modulated signal in one channel by an amount substantially equal to said time interval, said modulation responsive means further including means for adding the delayed modulated signal from said one channel and the undelayed modulated signal from a second channel whereby the first and second pulses from said one channel and said second channel, respectively, add to produce a combined pulse of increased amplitude.

3. A navigation system for aircraft within the service area of a ground station which are to fly in preassigned altitude layers, said system comprising a ground station which includes a radio locator system for obtaining the distance and azimuth of each of said aircraft, a transponder or repeater unit carried by each aircraft for receiving and retransmitting ground station signals, means for pulse time code modulating the retransmitted transponder signals with a different modulation signal assigned to each of said altitude layers, receiving means also carried by each of said aircraft for receiving said distance and azimuth information signals, means carried by each of said aircraft for reproducing said distance and azimuth signal information as a picture image having spots therein showing the positions of said aircraft with respect to said ground station, and means for identifying at an aircraft the spot in said picture image which corresponds to said aircraft, said radio locator system including a separate receiver channel for each of said altitude layers and modulation responsive means for each of said channels, and transmitting means for transmitting on separate channels the information appearing at the outputs of said channels, respectively, to the aircraft in said different altitude layers, respectively.

4. In an aircraft navigation system for aircraft that are to fly in preassigned altitude layers, a ground station comprising a radio locator system of the plan-position-indicator type for producing a picture image having spots therein showing the positions of said aircraft with respect to the ground station, a television transmitter system for transmitting signals representative of said picture image to said aircraft, a transponder or repeater unit for receiving and retransmitting ground station signals and a television receiver which are carried by each of said aircraft, means for pulse time code modulating the retransmitted transponder signals with a different modulation signal assigned to each of said altitude layers, said radio locator system including a separate picture-reproducing indicator for each of said altitude layers and modulation responsive means for each of said indicators, said television system including means for transmitting on separate channels the pictures appearing on each of said indicators, respectively, to the aircraft in said different altitude layers, respectively.

5. The system according to claim 4 wherein means including an altimeter is carried by each of said aircraft for changing the modulation of the transponder retransmitter and for also changing the tuning of the television receiver on the aircraft in response to said aircraft flying from one of said altitude layers to a different altitude layer.

6. In a navigation system for aircraft that are to fly in preassigned altitude layers, each aircraft carrying a television receiver for receiving signals representative of a radio locator picture and a map which are transmitted from a ground station and for reproducing said picture and said map as a composite picture having spots superimposed on said map showing the positions of said aircraft on said map, each aircraft also carrying a transponder or repeater unit for receiving and retransmitting ground station signals, means for pulse time code modulating the retransmitted transponder signals with a different modulation signal assigned to each of said altitude layers, a ground station which comprises a radio locator system for obtaining the distance and azimuth of each of said aircraft and for producing a picture having spots therein located in accordance with said distance and azimuth information and showing the positions of said aircraft, said radio locator system including a separate picture-reproducing indicator for each of said altitude layers and modulation responsive means for each of said indicators, and television transmitting means for transmitting on separate channels the pictures appearing on each of said indicators, respectively, to the aircraft in said different altitude layers, respectively, for also transmitting to said aircraft a map of at least a portion of the service area of said ground station.

7. In an aircraft navigation system for aircraft that are to fly in preassigned altitude layers, a ground station comprising a radio locator system of the plan-position-indicator type for producing a picture having spots therein showing the positions of said aircraft with respect to the ground station, a television transmitter system for transmitting said picture to said aircraft, a transponder or repeater unit for receiving and retransmitting signals transmitted from said ground station and a television receiver which are carried by each of said aircraft, means for modulating said retransmitted signals with a different modulation signal assigned to each of said altitude layers, each modulated signal comprising two pulses which are spaced by a predetermined assigned time interval, said locator system including a separate picture reproducing indicator for each of said altitude layers and modulation responsive means for each of said indicators, said modulation responsive means for each indicator including means for delaying the modulated signals in one channel by an amount substantially equal to the time interval assigned to the altitude layer for which the indicator is to produce indications and further including means for adding said delayed modulated signal from said one channel and the undelayed modulated signal from a second channel whereby the first and second pulses from the two channels, respectively, add to produce a combined pulse of increased amplitude, said television system including means for transmitting on separate channels the pictures appearing on each of said indicators, respectively, to the aircraft in said different altitude layers, respectively.

PHILIP J. HERBST.

REFERENCES CITED

The following references are of record in the file of this patent:

UNITED STATES PATENTS

| Number | Name | Date |
|---|---|---|
| 1,894,019 | Buckley | Jan. 10, 1933 |
| 2,027,530 | Hammond | Jan. 14, 1936 |
| 2,134,716 | Gunn | Nov. 1, 1938 |
| 2,252,083 | Luck | Aug. 12, 1941 |
| 2,307,029 | Elm | Jan. 5, 1943 |
| 2,312,203 | Wallace | Feb. 23, 1943 |
| 2,401,432 | Luck | June 4, 1946 |
| 2,403,603 | Korn | July 9, 1946 |
| 2,459,811 | Grieg | Jan. 25, 1949 |
| 2,468,045 | Deloraine | Apr. 26, 1949 |
| 2,513,282 | Busignies | July 9, 1950 |

FOREIGN PATENTS

| Number | Country | Date |
|---|---|---|
| 555,052 | Great Britain | Aug. 3, 1943 |